United States Patent
Schwarze et al.

(10) Patent No.: US 8,234,825 B2
(45) Date of Patent: Aug. 7, 2012

(54) SOLAR INSTALLATION INCLUDING AT LEAST ONE SOLAR MODULE HAVING A SPRING-LOADED MOUNTING OF THE COVER PLATE

(75) Inventors: Sascha Oliver Schwarze, Berlin (DE); Maik Schaefer, Berlin (DE)

(73) Assignee: Solon SE, Berlin (DE)

( * ) Notice: Subject to any disclaimer, the term of this patent is extended or adjusted under 35 U.S.C. 154(b) by 156 days.

(21) Appl. No.: 12/710,464

(22) Filed: Feb. 23, 2010

(65) Prior Publication Data

US 2010/0212661 A1    Aug. 26, 2010

(30) Foreign Application Priority Data

Feb. 23, 2009   (DE) .......................... 10 2009 010 225

(51) Int. Cl.
*E04D 13/18* (2006.01)
*F24J 2/46* (2006.01)
(52) U.S. Cl. ...................... 52/173.3; 126/705
(58) Field of Classification Search .............. 52/173.3, 52/173.1; 126/705, 704, 623; 248/148, 237
See application file for complete search history.

(56) References Cited

U.S. PATENT DOCUMENTS

| | | | | |
|---|---|---|---|---|
| 4,046,134 A | * | 9/1977 | Scott | 126/599 |
| 4,123,883 A | * | 11/1978 | Barber et al. | 52/200 |
| 4,201,190 A | * | 5/1980 | Bowen | 126/704 |
| 4,223,667 A | * | 9/1980 | Paymal | 126/621 |
| 4,252,109 A | * | 2/1981 | Newton | 126/705 |
| 4,266,383 A | * | 5/1981 | Krueger et al. | 52/204.597 |
| 4,278,070 A | * | 7/1981 | Bowen | 126/704 |
| 4,341,200 A | * | 7/1982 | Bowen | 126/704 |
| 4,706,650 A | * | 11/1987 | Matzkanin | 126/638 |
| 5,505,788 A | * | 4/1996 | Dinwoodie | 136/246 |
| 5,571,338 A | * | 11/1996 | Kadonome et al. | 136/251 |
| 6,012,449 A | * | 1/2000 | Schulz | 126/621 |
| 6,105,316 A | * | 8/2000 | Bottger et al. | 52/173.3 |
| 6,336,304 B1 | * | 1/2002 | Mimura et al. | 52/748.1 |
| 6,414,237 B1 | * | 7/2002 | Boer | 136/251 |
| 6,516,794 B2 | * | 2/2003 | Karni et al. | 126/682 |
| 6,584,737 B1 | * | 7/2003 | Bradley, Jr. | 52/173.3 |
| 6,786,012 B2 | * | 9/2004 | Bradley, Jr. | 52/173.3 |

(Continued)

FOREIGN PATENT DOCUMENTS

DE    2811604 A   *   9/1979

(Continued)

*Primary Examiner* — Basil Katcheves
*Assistant Examiner* — Rodney Mintz
(74) *Attorney, Agent, or Firm* — Leydig, Voit & Mayer Ltd.

(57) ABSTRACT

A solar installation includes at least one solar module. The at least one solar module includes a cover plate and a housing box. The housing box includes housing walls, a frame construction including a substantially L-shaped support profile, the support profile including a transverse leg disposed edge-parallel on a bottom side of the cover plate with a seal interposed therebetween and a longitudinal leg connected to the housing wall. A detent device has at least one upper detent element and one lower detent element for fixing the cover plate on the housing box. A spring-loaded mounting includes at least two spring elements for mounting the cover plate on the housing walls, via the at least two spring elements. The at least two spring elements have a predetermined vertical stroke and are configured to generate a restoring force.

18 Claims, 7 Drawing Sheets

U.S. PATENT DOCUMENTS

| | | | |
|---|---|---|---|
| 7,155,870 B2 * | 1/2007 | Almy | 52/544 |
| 7,686,268 B2 * | 3/2010 | Terunuma et al. | 248/237 |
| 7,730,676 B2 * | 6/2010 | Hon | 52/173.3 |
| 2004/0221524 A1 * | 11/2004 | Poddany et al. | 52/204.5 |
| 2007/0199561 A1 | 8/2007 | Soucy | |
| 2008/0011289 A1 * | 1/2008 | Sichanugrist et al. | 126/634 |
| 2008/0302407 A1 * | 12/2008 | Kobayashi | 136/251 |
| 2008/0308093 A1 * | 12/2008 | Gianasso et al. | 126/622 |
| 2009/0165843 A1 * | 7/2009 | Horioka et al. | 136/251 |
| 2010/0043781 A1 * | 2/2010 | Jones et al. | 126/704 |
| 2010/0154784 A1 * | 6/2010 | King et al. | 126/623 |
| 2010/0212657 A1 * | 8/2010 | Moller | 126/623 |
| 2010/0212658 A1 * | 8/2010 | Moller | 126/623 |
| 2010/0242381 A1 * | 9/2010 | Jenkins | 52/173.3 |
| 2010/0282290 A1 * | 11/2010 | Schwarze et al. | 136/244 |
| 2011/0277400 A1 * | 11/2011 | Kosslinger et al. | 52/173.1 |
| 2011/0303212 A1 * | 12/2011 | Schwarze | 126/569 |
| 2011/0314752 A1 * | 12/2011 | Meier | 52/173.3 |

FOREIGN PATENT DOCUMENTS

| | | |
|---|---|---|
| DE | 2836219 A1 | 2/1980 |
| DE | 9310063 U1 | 8/1993 |
| DE | 29520203 U1 | 2/1996 |
| DE | 29612893 U1 | 9/1996 |
| DE | 19652568 A1 | 6/1998 |
| DE | 202006010460 U1 | 11/2006 |
| DE | 102008028489 A1 | 1/2009 |
| EP | 0877214 A2 | 11/1998 |
| EP | 1146297 A1 | 10/2001 |
| EP | 1233238 A1 | 8/2002 |
| WO | WO 2007071805 | 6/2007 |

* cited by examiner

SOLAR INSTALLATION INCLUDING AT LEAST ONE SOLAR MODULE HAVING A SPRING-LOADED MOUNTING OF THE COVER PLATE

CROSS-REFERENCE TO PRIOR APPLICATIONS

This application claims benefit to German Patent Application No. DE 10 2009 010 225, filed on Feb. 23, 2009, and which is hereby incorporated by reference herein.

FIELD

The present invention relates to solar installations having at least one solar module having a housing box having a cover plate and a frame construction made of a basically at least L-shaped support profile.

BACKGROUND

In times of increasing energy scarcity and environmental strain, clean regenerative energy conversion from solar energy, which shines at no cost, receives particular significance. In particular commercial and private roof areas (generally referred to as "substrate", because it can also be a concrete surface having horizontal, vertical, or inclined orientation) may thus be reconfigured to form useful surfaces. Solar energy can be used directly for obtaining power (photovoltaics), for heating water (solar thermal energy), and/or for generating fuel by photovoltaic-induced water splitting. A solar module, whether for obtaining power, heat, or fuel, a solar module for obtaining heat frequently being referred to as a "solar collector", typically comprises a rectangular housing box having a cover plate, which is retained fixedly on the housing box via a frame construction. In a row configuration of solar modules, their maintenance and replacement is relatively simple, because there is good accessibility to the individual modules. In a matrix configuration of solar modules— also having different functions—having multiple rows and columns, accessibility of the inner solar modules in particular is only provided with difficulty. This access must also only occur via the cover plate. The simple removal thereof is a condition for this purpose.

Laying a simple glass pane as a cover plate with a round cord seal interposed on an essentially L-shaped support profile and clipping it fixedly there using a mushroom-shaped sealing lip, is described in a solar collector from German Utility Model G 92 119121 U1. The sealing lip has projections for this purpose, which engage behind angles in the support profile. The sealing lip is simultaneously used for anchoring and sealing the glass pane in the housing box. It is only possible to remove the glass pane by pulling the projections of the sealing lip out of angles in the support profile. However, the sealing lip loses its anchoring and sealing capabilities due to occurrences of age. A similar configuration for a hybrid collector for simultaneously obtaining power and heat, in which the cover plate is situated as a photovoltaic plate for obtaining power over an absorber plate for obtaining heat, is described in German Utility Model DE 20 2006 010 460 U1.

Laying the glass pane on the edge of the housing box over a seal unit is also described in a solar collector from European Patent Application EP 0 877 214 A2. The seal unit is used for adaptation to different pressure conditions in the housing box and has an inner soft-elastic seal element, a middle hard-elastic seal element, and an outer plastic seal element. The plasticity of the plastic seal element increases with rising temperature, so that the plastic seal element begins to flow and fills up the intermediate space between glass pane and edge of the housing box. It is only possible to dismount the glass pane by destroying the plastic seal. The hard-elastic seal element is used as a slightly deformable mounting of the glass pane. The soft-elastic seal element is constructed as closed-cell and ensures a slight restoration of the seal unit in the unpressurized state. The glass pane is locked using an enclosing edge protector, about which no further statements are made, however.

A seal which is also to compensate for plate movements in a solar collector is described in German Utility Model DE 296 12 893 U1. A simple glass pane is situated over the absorber pane using a double V-shaped and slotted seal here. The seal is located below the glass pane and is clipped onto a hook bracket in a frame profile. The seal is glued onto the glass pane. It is only possible to remove the glass pane by destroying the glued joint or pulling down the seal from the hook bracket. The frame profile does not touch the glass pane, so that it has no further direct framing. Laying an inclined solar panel in a frame profile, which has two round grooves, is described in European Patent Application EP 1 146 297 A1. Sheet-metal screws are screwed through the housing wall of the housing box to fix the frame profile therein. The frame profile encloses and fixes the solar panel only in the direction of inclination. The frame profile has no enclosure of the solar panel transversely to the inclination, so that no edges, at which running water could accumulate and result in contamination, arise here.

Furthermore, a hybrid module for combined solar power and heat generation is described in German Published Application DE 10 2008 028 489 A1, in which the photovoltaic plate, as a laminate without further cover, and the absorber plate are received by an F-shaped frame profile. For the fastening, the longitudinal leg of the frame profile is implemented as doubled and is put onto a single-edged housing profile. The entire module can thus be pulled off upward. Further sealing measures are not disclosed, however. A similar frame profile for solar collector is described in German Published Application DE 196 52 568 A1.

An edge-free cover plate is fixed and sealed on a support profile relative to a profile web with the aid of a lateral seal. The support profile has a split vertical leg, in which two detent grooves are located. To fix the cover plate with the support profile on the housing box, the housing wall has lateral detent ribs, over which the detent grooves are pushed so that they lock behind them. It is only possible to remove the cover plate by forcefully overcoming the detent force.

European Patent Application EP 1 233 238 A1 describes a frame construction for fixedly holding a glass pane as a cover plate on a housing box is disclosed for a solar installation for heat generation (solar collector). The frame construction comprises an essentially L-shaped support profile, on whose transverse leg a glass pane is laid as a cover plate with a round cord seal interposed. The longitudinal leg of the support profile is connected in a way not described in greater detail to a housing wall of the housing box (also not shown in greater detail). The glass pane is locked on the housing box using a detent device. For this purpose, an essentially F-shaped cover bracket is used, whose longitudinal leg engages over the glass pane with a detent seal interposed on the top side of the glass pane and which has a detent rib as a detent element on the inner side of one of the two transverse legs. The cover bracket is pushed over a corresponding detent rib as the other detent element on the longitudinal leg of the support profile therewith, so that cover bracket and support profile fixedly lock with one another. Removing the glass pane is again only possible by forcefully overcoming the detent force and completely removing the cover bracket while cutting through the seal on the top side of the glass pane, controlled actuation of the detent device and/or the detent elements is not provided. On the other hand, however, only the detent force applied by the detent device via the cover bracket ensures the locking of the cover plate under wind attack load. Because the cover bracket overlaps the glass pane, it is not free of edges and a recess results on the glass pane on which contaminants may accumulate rapidly. In addition, the frame construction is dependent on the thickness of the cover plate due to the overlap of the cover bracket over the glass pane.

SUMMARY

In an embodiment, the present invention provides a solar installation including at least one solar module. The at least one solar module includes a cover plate and a housing box. The housing box includes housing walls, a frame construction including a substantially L-shaped support profile, the support profile including a transverse leg disposed edge-parallel on a bottom side of the cover plate with a seal interposed therebetween and a longitudinal leg connected to the housing wall. A detent device has at least one upper detent element and one lower detent element for fixing the cover plate on the housing box. A spring-loaded mounting includes at least two spring elements for mounting the cover plate on the housing walls, via the at least two spring elements. The at least two spring elements have a predetermined vertical stroke and are configured to generate a restoring force. The at least two spring elements are disposed edge-parallel on opposing edges of the cover plate on the bottom side thereof. Seal elements are disposed in front of the spring-loaded mounting toward an outer side of the housing box. The upper detent element is fixedly connected to the support profile, the support profile being fixedly connected to the cover plate. The lower detent element is fixedly connected to the housing box. The upper detent element and the lower detent element have a spacing of at most the vertical stroke relative to one another when the detent device is in an open position and the cover plate is disposed on the housing box. The upper detent element and lower detent element have a detachable engagement to one another when the detent device is in a closed position with the cover plate fixed on the housing box under load of the restoring force.

BRIEF DESCRIPTION OF THE DRAWINGS

The solar installation according to the invention is explained in greater detail hereafter in various variants on the basis of exemplary embodiments for individual details in the schematic figures. Other features and advantages of the various embodiments of the solar installation on according to the present invention will become apparent by reading the following detailed description with reference to the attached drawings which illustrate the following.

DETAILED DESCRIPTION

The invention relates to a solar installation having at least one solar module having a housing box having a cover plate and a frame construction made of an essentially at least L-shaped support profile, whose transverse leg is situated edge-parallel with a seal interposed on the bottom side of the cover plate and whose longitudinal leg is connected to a housing wall of the housing box, and a detent device having an upper detent element and a lower detent element for fixing the cover plate on the housing box.

An embodiment of the present invention can therefore be seen as providing a solar installation in which the frame construction for fixedly holding the cover plate on the housing box is implemented using a detent device so that it is possible to install and remove the cover plate—even in the inner area of a module field—arbitrarily frequently and free of damage without problems. However, the detent force exerted by the detent device is nonetheless to be sufficiently great that the cover plate is reliably prevented from lifting off under wind attack.

In addition, contamination of the top side of the cover plate by frame parts which overlap the edge is avoided. Finally, the frame construction is to be designed so that different cover plates and thus also different solar modules may be used without frame changes, a harmonic appearance also being ensured in particular, however.

In the solar installation according to an embodiment of the invention, on the one hand, a spring-loaded mounting of the edge-free cover plate on the housing walls via at least two spring elements is provided. The spring elements can execute a vertical stroke, which is predetermined in its size, while generating a restoring force and are situated parallel to the edges at opposing edges of the cover plate on the bottom side thereof. To actuate the detent device in the solar installation according to the invention, the defined preset of a vertical stroke for the spring-loaded mounting of the cover plate is significant. A typical elastic round cord seal or sealing bead does not have the required vertical stroke. Furthermore, at least seal elements are mounted in front of the spring-loaded mounting toward the outer side of the housing box to protect from penetrating water. On the other hand, a special implementation of the detent device is provided in the invention, which rests on the spring-loaded mounting of the cover plate. For this purpose, at least one upper detent element, which is fixedly connected to the support profile, which is in turn fixedly connected to the cover plate, and at least one lower detent element, which is fixedly connected to the housing box, are provided. With open detent device when the cover plate is laid on the housing box, the two detent elements have a spacing of at most the vertical stroke to one another. With closed detent device when the cover plate is fixed on the housing box, the cover plate would be pressed downward by the precisely predetermined vertical stroke of the spring elements and the two detent elements would have a removable engagement with one another. The engagement (the lock) is under the load of the restoring force generated by the spring elements, so that disengagement is possible easily. It is not possible with the invention for the cover plate to simply be lifted up by attacking wind loads and overcoming the detent force. On the other hand, arbitrarily frequent installation and removal of the cover plate on and from the housing box is possible without problems—even if the housing box is located in the middle of a module field—without damaging or destroying installation elements. By using two powerful installation suction cups, for example, an installer can insert and lock the cover plate at any time, but also unlock and lift it. Furthermore, through the configuration of the support profile below the cover plate and the consequent avoidance of profiles which overlap the edge on the top side of the cover plate, no dirty edges arise. The cover plate can lie in the water runoff plane in in-roof systems and form the water-guiding layer. In addition, through this configuration, the frame construction is not a function of the size and thickness of the cover plate, so that it can be implemented arbitrarily. In particular in hybrid module fields (having mixed functions for at least power and heat generation), the cover plate can also be implemented identically on all housing boxes, however, so that a particularly harmonic appearance results and it is not recognizable to the observer which type of module is located below the particular cover plate.

The cover plate is mounted on the lateral surfaces of the housing walls of the housing box via the spring-loaded mounting. In order to prevent water from penetrating into the interior of the housing box, seal elements are mounted in front of the spring-loaded mounting toward the outer side of the housing box. A parallel configuration of the spring elements and seal elements can be performed, for example. The spring elements can be simple pressure-loaded coiled springs, for example, which are situated at multiple points on the lateral surface of a housing wall. For example, a sealing cord can be situated in parallel in front of the compression springs on each lateral surface.

According to a preferred embodiment of the invention, the spring elements may be integrated in the seal elements and form integral spring seals. Spring seals of this type have both a spring-loaded action having a defined vertical stroke and also a sealing action against penetrating water. A spring seal of this type can preferably be constructed as an elastic sealing lip implemented as essentially lambda-shaped. A sealing lip of this type is characterized by three legs. In the invention, the upper leg of the sealing lip may preferably adjoin the transverse leg of the support profile and the two lower legs (running diagonally to the interior of the housing box and diagonally outward) may adjoin the housing box. The spring-loaded mounting of the cover plate then occurs via the upper leg and the first lower leg running diagonally downward toward the interior of the housing box. These two legs define the vertical stroke of the cover plate via their length, their angle of attack, and their elasticity. The second lower leg running diagonally forward is used to seal the inner chamber of the housing box against penetrating water. To be able to amplify the spring action still further and/or define it more precisely, an open-celled elastic profile can preferably be situated between the two lower legs of the lambda-shaped sealing lip. Due to the open cells, for example, in the form of holes, after the elastic profile is compressed, it is restored into its original shape (as with a sponge). To fasten the lambda-shaped sealing lip, according to another refinement of the invention, it can preferably have a u-shaped bend of the upper leg, which engages in a u-shaped bend of the end of the transverse leg of the support profile. A fixed connection between the two angles like a flat-fell seam then results.

A preferred implementation of the seal element as a three-legged sealing lip which is implemented as essentially lambda-shaped is therefore advantageously provided in the invention. The first leg of the lambda-shaped sealing lip (the leg pointing upward) adjoins the transverse leg of the support profile. The second leg (one of the two legs pointing diagonally downward) adjoins the lateral surface of the housing wall lying below it, is implemented as elastic, and has the length which determines the vertical stroke. This leg is compressed and relieved again to actuate the detent device. The third leg of the lambda-shaped sealing lip protrudes freely beyond the housing wall outside the housing box. This leg thus fulfills a pure sealing function and ensures that runoff water does not hit the transition between support profile and housing wall. Furthermore, a defined and secure connection of the first leg (pointing upward) of the lambda-shaped sealing lip to the support profile can preferably be achieved advantageously in that the first leg of the sealing lip has a u-shaped bend, which engages in a u-shaped bend of the end of the transverse leg of the support profile.

Known detent devices which are based on two detent elements fastened to the objects to be locked may certainly be used in the implementation of the detent device. For the invention, an implementation of the lower detent element as a pin situated in the interior of the housing box and an implementation of the upper detent element as an undercut profile situated on the longitudinal leg of the support profile, which has an insertion area and a retention area for the pin, may preferably be used. A lateral displaceability of the cover plate on the housing box in the direction of the insertion area is also necessary for an implementation of this type. To lock the cover plate, it is pressed down against the restoring force of the spring elements, so that the pins in the interior of the housing box reach the insertion areas of the undercut profiles of the support profiles. By laterally displacing the cover plate in the depressed state, the pins are then transferred along the insertion areas into the retention areas of the undercut profiles. By relieving the spring elements, the cover plate is raised again by the predetermined stroke, so that the pins engage and lock in the retention areas. It is only possible to unlock the cover plate by reverse execution of the engagement procedure. The pins may preferably be implemented as bolts which are fixedly connected to a support plate. The support plate provides the bolts with stability and ensures good fastening on the inner side of the housing wall.

Alternatively, an implementation of the upper detent element as a pin extension on the end of the longitudinal leg and the lower detent element as a pivotable and spring-loaded detent hook situated on the housing wall can also be provided in the invention for the detent device. For this embodiment, lateral displaceability of the cover plate is not necessary. The plate is simply pressed into the yielding detent hooks and locked from above using the pin extensions via the vertical stroke. Unlocking is then performed by pressing back the detent hook using a suitable tool. The cover plate is pressed upward by the restoring force of the spring-loaded mounting and can be removed easily. It is advantageous if the detent device can be fixed in the open position in a spring-loaded retention hook during the removal of the detent hooks.

Another alternative can advantageously also be characterized in the invention by a lower transverse leg on the support profile or on the auxiliary profile (see below), which runs in the inner area of the housing box, and an implementation of the upper detent element as an insertion profile in the lower transverse leg and an implementation of the lower detent element as a detent bolt having an insertion groove, the detent bolt being connected to the housing box, in particular to its floor. This alternative essentially corresponds to the first-mentioned embodiment of the detent device, the upper detent element now being situated in an additional transverse leg of the support profile, however. The upper detent element in the form of the insertion area is brought into the acquisition area of the detent bolt by pressing down the cover plate via the spring-loaded mounting and locked by lateral displacement of the cover plate, the restoring force on the cover plate contributing to the locking. The reverse procedure is to be performed for the removal.

To further improve the locking, the longitudinal legs of the support profiles may be implemented as reinforced at least in the area of the undercut profiles. To additionally further improve the secure mounting of the cover plate on the housing box, another modification of the invention is advantageously characterized by a configuration of an L-shaped auxiliary profile, whose shorter leg supports the cover plate in extension of the transverse leg of the support profile and whose longer leg is situated parallel to the longitudinal leg of the support profile. An essentially T-shaped support profile results, which can be implemented in multiple parts, or also as integral. This can be a solid embodiment or a multilayered one-piece embodiment produced from curved sheet-metal, for example. A configuration of the support profile on the two diametrically opposite housing walls of the housing box is advantageous for the detent device in the invention, in order to ensure good spring-loaded mounting and locking reliably. With a rectangular embodiment of the housing box, these are typically the two longer housing walls. Mounting and locking on the two diametrically opposite shorter housing walls is also possible, however.

In the previously described embodiments of the detent device according to the invention, the upper and the lower detent elements were always described. In the minimal case, the detent device has precisely one upper and one lower detent element, which are advantageously mounted in the middle of the longitudinal edges (or also transverse edges) of the housing box. A further improvement of the detent force results, however, if multiple detent elements are situated along the housing walls of the housing box. For good securing of the cover plate on a housing box of normal dimensions (having a longitudinal edge in a range of 1.80 m), it is advantageous if three detent elements are provided in each case (centrally and in the two edge areas of the housing wall), for example. The cover plate is then fixed securely at three points along its longitudinal edges on both sides against all attacking wind loads.

A further improvement of the mounting results if the auxiliary profile is situated peripherally on all four edges of the cover plate. This is also true for seal elements, so that the interior of the housing box is securely protected from penetrating water. The cover plate is then supported over the entire area in the entire edge area and can be securely laid in place, but also removed again. A combined profile made of girder and auxiliary profiles preferably runs on the two longitudinal edges and only the auxiliary profile runs on the two narrow edges of the housing box. For further securing against lifting of the cover plate under attacking wind load, an outwardly bent, u-shaped end of the long leg of the auxiliary profile can advantageously also be provided without a detent device in the area of one edge of the cover plate. When the detent device is closed, the u-shaped end engages in an undercut in the housing wall. Further embodiments of design modifications of this type can be inferred from the special part of the description.

It was already stated above that the solar installation according to the invention can comprise a module matrix. It can preferably be implemented as an in-roof installation, i.e., the modules are integrated in the roof skin, in the roof tiles, and do not rest thereon. An adjacent configuration of multiple housing boxes and cover plates is preferably possible, a gap being provided between the adjacent cover plates. This gap is used for removing the cover plates, for example, for laterally displacing the cover plates to push the pin out of the insertion area or to insert a tool, for example, to push back the detent hook. A uniform, harmonic gap thus results between all provided cover plates. Because the cover plates lie in the water-guiding plane with in-roof embodiments, the water can run off in the gaps along the cover plates. Fundamentally, the cover plate can protrude somewhat beyond the housing walls on all four housing sides. The interior of the housing box is securely protected by seals from penetrating water. Furthermore, cover sheets or attachment sheets are advantageously situated between adjacent housing boxes or between the housing box and the adjacent substrate in order to ensure correct water runoff. Between two adjacent housing boxes, the cover sheets can be implemented as simple sheets having two angled edges, which wrap around the housing walls below the spring-loaded mounting and are pressed against the housing walls by the spring-loaded mounting. In order to ensure good ventilation of the housing box and thus avoid the buildup of condensed or accumulated water, it is additionally advantageous if ventilation openings are provided in the housing walls of the housing box.

As already stated above, it is possible using the solar installation according to the invention to install solar modules of different technical functions on a substrate, such as a roof, without thus destroying the harmonic overall appearance. Known installations exclusively have framed modules for this purpose. All solar modules in the invention, however, have a uniform frameless cover plate.

It can preferably be a simple glass plate, which covers the absorber plate in a solar collector or represents a simple window without further technical function. However, it can also be a photovoltaic plate which can be implemented as a glass plate having solar cells situated on the bottom or as a laminate having embedded solar cells. Solar current or also— in a corresponding embodiment having an electrolyte—fuel may be generated. Thus, in the solar installation according to the invention, an advantageous matrix-shaped configuration of photovoltaic modules and/or thermal solar modules and/or fuel modules and/or window modules can particularly preferably be provided, all modules being covered using a cover plate which is uniformly designed on the visible side. It is possible that each solar module has only one function, but housing hybrid modules having multiple technical functions is also possible. For a hybrid module having simultaneous generation of solar current and heat, the use of a selectively acting reflector is particularly advantageous.

Figure 1:
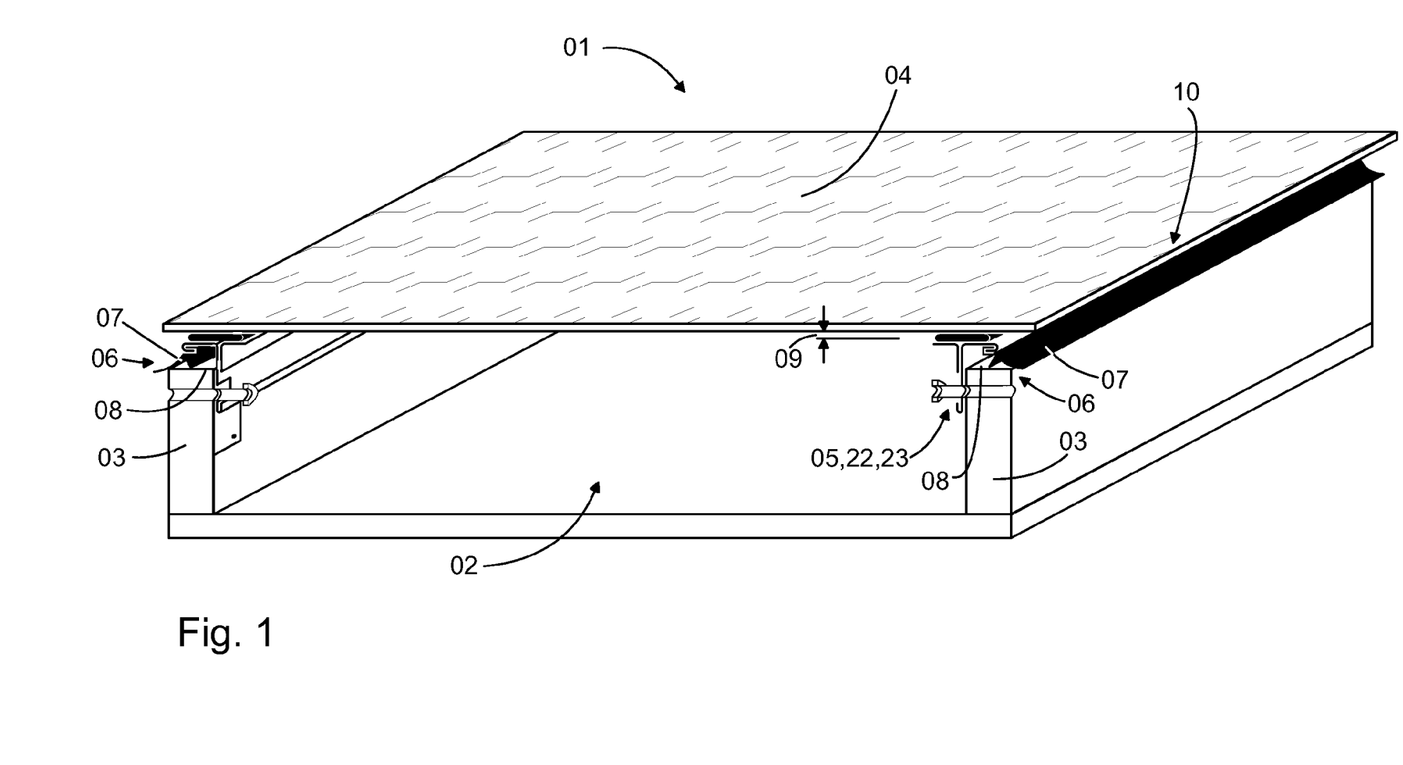
FIG. 1 shows a cross-sectional detail in the area of the housing box.

FIG. 1 shows a solar installation 01 according to the invention, for example, for generating solar power or heat, to be situated on a substrate, for example, on an inclined roof surface or a horizontal concrete surface.

A rectangular housing box 02 having housing walls 03 and an edge-free cover plate 04, which is locked on the housing box 02 using a detent device 05, is shown in the sectional detail. The cover plate 04 is mounted via a spring-loaded mounting 06 having at least two spring elements 07 on lateral surfaces 08 of the housing wall 03 at diametrically opposite edges 10 of the cover plate 04.

Figure 2:
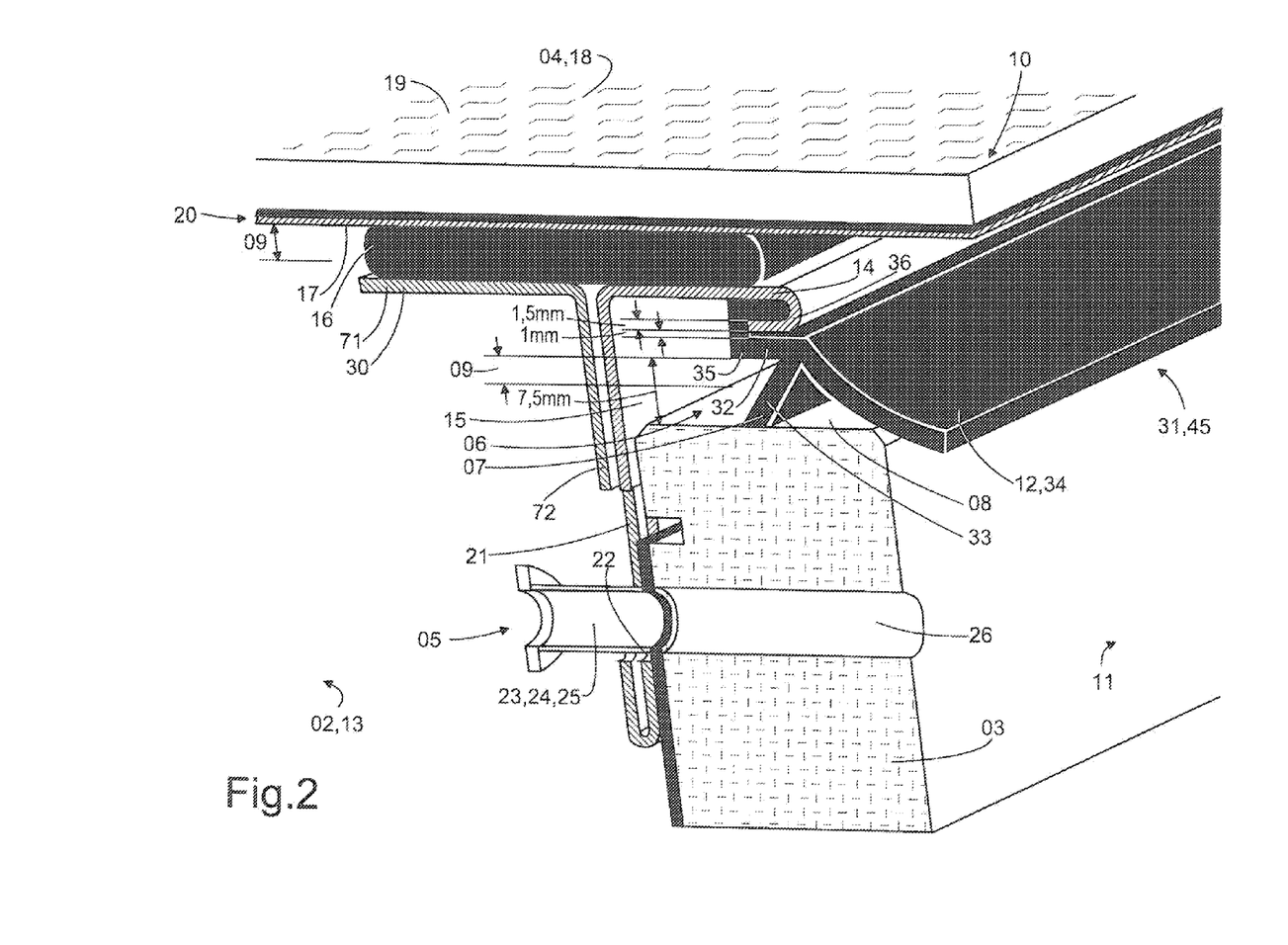
FIG. 2 shows a cross-sectional detail in the area of the spring-loaded mounting.

FIG. 2 shows a first embodiment of the invention in the sectional detail in the area of the spring-loaded mounting 06 on a housing wall 03 and the locking 05. A spring element 07 is shown, which can execute a predetermined vertical stroke 09, which is between 2 mm and 12 mm, for example, while generating a restoring force. The spring elements 07 are situated on diametrically opposite edges 10 of the cover plate 04, so that they execute the vertical strokes 09 uniformly and the restoring force of the spring elements 07 is applied to them when they are pressed down.

A seal element 12, which prevents the penetration of water into the inner area 13 of the housing box 02, is mounted in front of the spring-loaded mounting 06 toward the outer side 11 of the housing box 02. The cover plate 04 is mounted on a transverse leg 14 of an at least essentially L-shaped support profile 15, which runs parallel to the edge 10 in edge area of the cover plate 04, via a seal 16, made of sealant adhesive in the exemplary embodiment shown, and is also fixedly connected in the invention. The spring-loaded mounting 06 over the support profile 15 rests on the bottom side 17 of the cover plate 04, so that it is free of edges (no fastening profiles in the edge area). In the exemplary embodiment shown, the cover plate 04 is a photovoltaic plate 18 made of a glass pane 19 (superstrate) and a solar cell layer 20. A longitudinal leg 21 of the support profile 15 is connected to the housing wall 03. The detent device 05, comprising an upper detent element 22 (compare FIG. 3), which is fixedly connected to the support profile 15, and a lower detent element 23, which is fixedly connected to the housing wall 03, is located in the lower area of the longitudinal leg 21. Support profile 15 and upper detent element 22 are thus fixedly connected to the cover plate 04 and are installed and/or removed together therewith. The lower detent element 23 is a pin 24, which is fastened in the form of a bolt 25 on a support plate 46, in the exemplary embodiment shown. The through hole 26 shown in the area of the lower detent element 23 makes it easier to install the cover plate 04, because the position of the lower detent element 23 is thus detectable from the outer side 11 of the housing box 02.

In the selected exemplary embodiment, the spring-loaded mounting 06 has two elastic sealing lips 31, which are implemented as essentially lambda-shaped. These integrate the spring elements 07 and the seal elements 12 in integral form in a spring seal 45. An upper leg 32 of the sealing lip 31 adjoins the transverse leg 14 of the support profile.

A first lower leg 33 directly adjoins the lateral surface 08 of the housing wall 03. A second lower leg 34 protrudes beyond the housing wall 03 toward the outer side 11 of the housing box 02 and thus protects the inner area 13 from penetrating water. The second lower leg 34 thus forms the seal element 12 in this embodiment. The executable vertical stroke 09 of the cover plate 04 is determined via the embodiment of the spring seal 45 (in the insert in FIG. 2, dimensioning of the spring seal 45 is shown in the scale 2:1). The upper leg 32 has a first u-shaped bend 35, using which it engages in a second u-shaped bend 36 (each angular or round) of the transverse leg 14 of the support profile 15. In this way, both elements are fixedly connected to one another like a flat-fell seam, a glued joint also being able to support the strength of the connection. The secure connection is important, because upon removal of the cover plate 04, the sealing lip 31 remains on the support profile 15 and thus on the cover plate 04 and is reused upon reinstallation of the cover plate 04.

Figure 3:
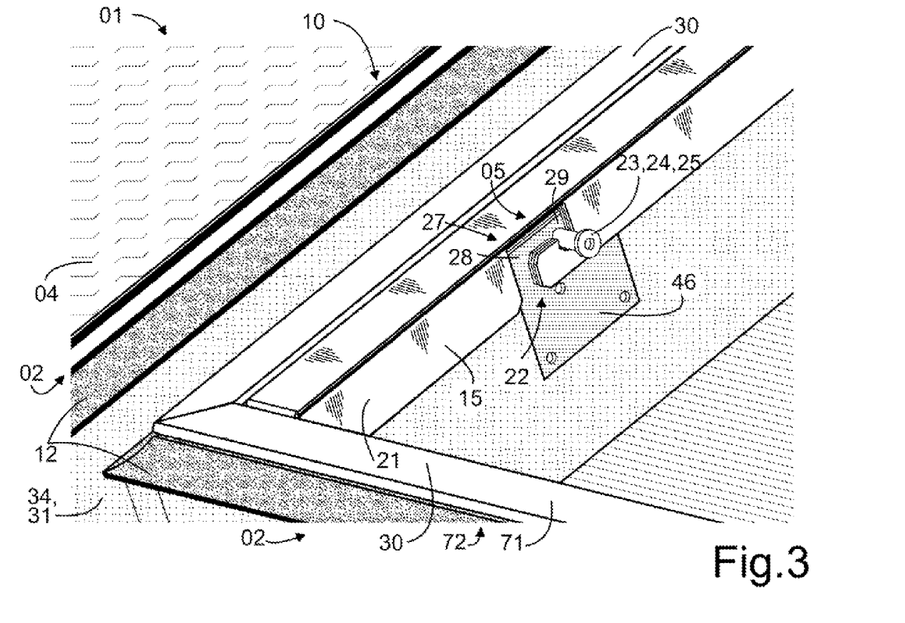
FIG. 3 shows a detail view in the area of the housing box.

A perspective top view of the solar installation 01 according to the invention with (left) and without (right) cover pane 04 on two housing boxes 02 is shown in FIG. 3. On the right, the support profile 15 and the detent device 05 made of lower detent element 23 and upper detent element 22 are shown. In the selected exemplary embodiment, the upper detent element 22 is implemented as an undercut profile 27 having an insertion area 28 and a retention area 29 for the bolt 25. To lock the cover pane 04—after the cover pane 04 is laid on the housing box 02—the bolt 25 is inserted into the insertion area 28 by pressing down the spring-loaded mounting 06 having a vertical stroke 09, subsequently guided further by lateral displacement of the cover plate 04 into the insertion area 28, and finally inserted into the retention area 29 and locked therein via the restoring force by relieving the spring-loaded mounting 07. Correspondingly, the size of the vertical stroke 09 must be adapted to the dimensions of the insertion area 28 (compare also FIG. 4). A removal of the cover plate 04 is performed correspondingly in the reverse sequence.

Furthermore, the seal element 12 (here as a second lower leg 34 of the lambda shaped sealing lip 31) and an auxiliary profile 30, which is also implemented as L-shaped and runs around all edges 10 of the cover plate 04, can be seen in FIG. 3. The cover plate 04 is thus securely mounted and water cannot reach the inner area 13 of the housing box 02. The auxiliary profile 30 has one short leg 71, which also supports the cover plate 04, and one long leg 72 (compare FIG. 2), which runs parallel to the longitudinal leg 21 of the support profile 15 (or is implemented integrally therewith, the support profile 15 is then implemented as T-shaped). Cover sheets between the housing boxes 02 are not shown in this FIG. 3.

Figure 4:
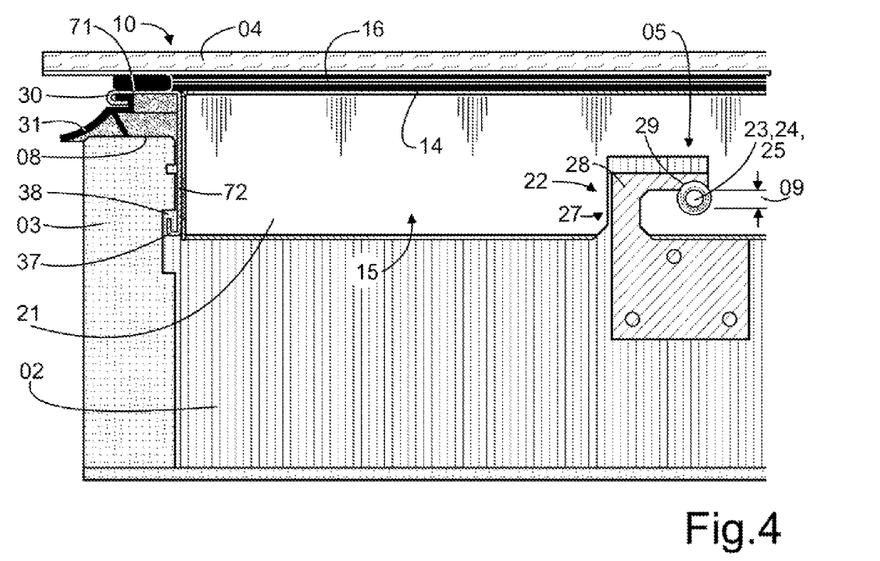
FIG. 4 shows a detail/sectional view in the inner area of the housing box.

A cross section through the solar installation 01 according to the invention is shown in FIG. 4. It can additionally be seen here that the auxiliary profile 30 has an outwardly curved u-shaped end 37 in the area of an edge 10 of the cover plate 04 without detent device 05, using which it engages in an undercut 38 in the housing wall 03 when the detent device 05 is locked. The cover plate 04 thus cannot be lifted by wind load at any edge 10 when the detent device 05 is locked. The detent device 05 having the upper detent element 22 (undercut profile 27 having insertion area 28 and retention area 29) and the lower detent element 23 (pin 24 or bolt 25 and support plate 46) and the relationship of the vertical stroke 09 to the dimensions of the undercut profile 27 can also be seen.

Figure 5A:
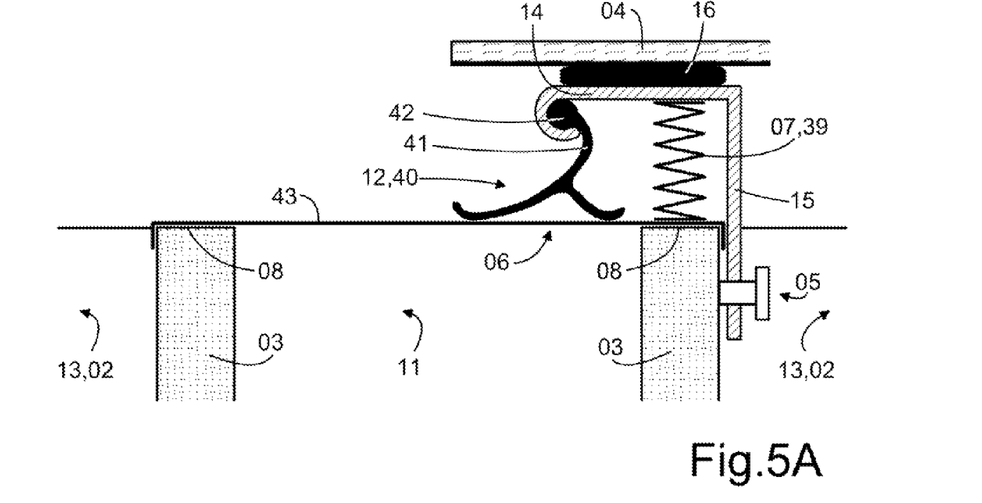
FIGS. 5A, 5B show further embodiments of the spring-loaded mounting.
Figure 5B:
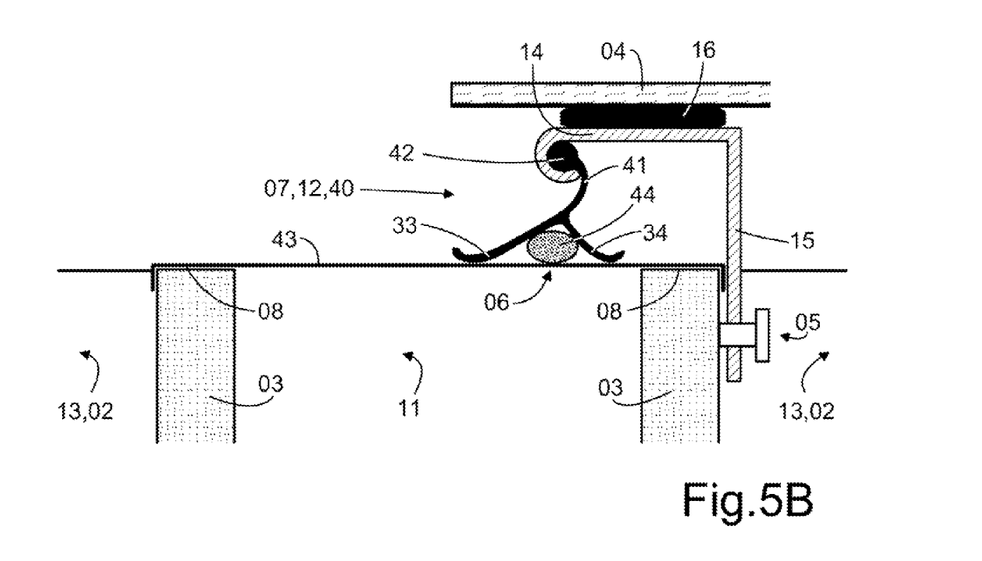

FIGS. 5A and 5B schematically show the spring-loaded mounting 06 in further embodiments in cross-section. FIG. 5A shows a parallel configuration of spring element 07 and seal element 12. The seal element 12 is mounted in front of the spring element 07 toward the outer side 11 of the housing box 02. The spring element 07 is a simple pressure-loaded coiled spring 39, three of which are situated along each long housing wall 03 of the housing box 02, for example. The seal element 12 is a lambda-shaped sealing lip 40, but in a different embodiment than the sealing lip 31. The upper leg 41 is connected in the exemplary embodiment shown via a lenticular head 42 to the transverse leg 14 of the support profile 15. A cover sheet 43, which is angled on both sides, for covering the outer side 11 between adjacent housing boxes 02 is situated between the spring-loaded mounting 06 and the lateral surfaces 08 of adjacent housing boxes 02. The sealing lip 40 is supported on the cover sheet 43, and the cover sheet 43 can have openings in the area of the coiled springs 39.

An integral embodiment of spring element 07 and seal element 12 is shown in FIG. 5B. The seal element 12 is again formed by the sealing lip 40. The spring element 07 is formed primarily by an open-celled elastic profile 44 between the lower legs 33, 34, however, which can be compressed like a sponge and expands again upon relief.

Figure 6A:
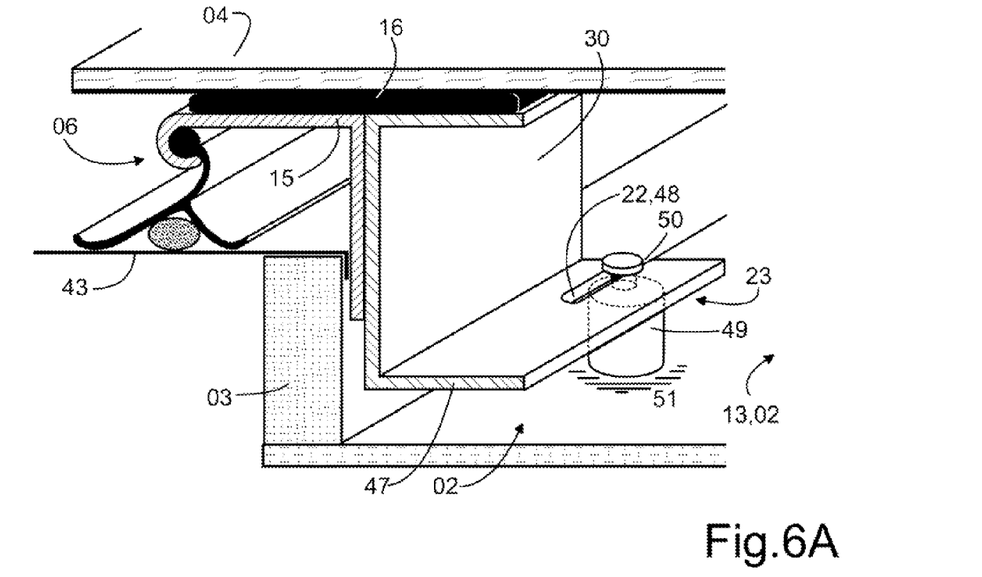
FIGS. 6A, 6B, 6C show further embodiments of the detent device.
Figure 6B:
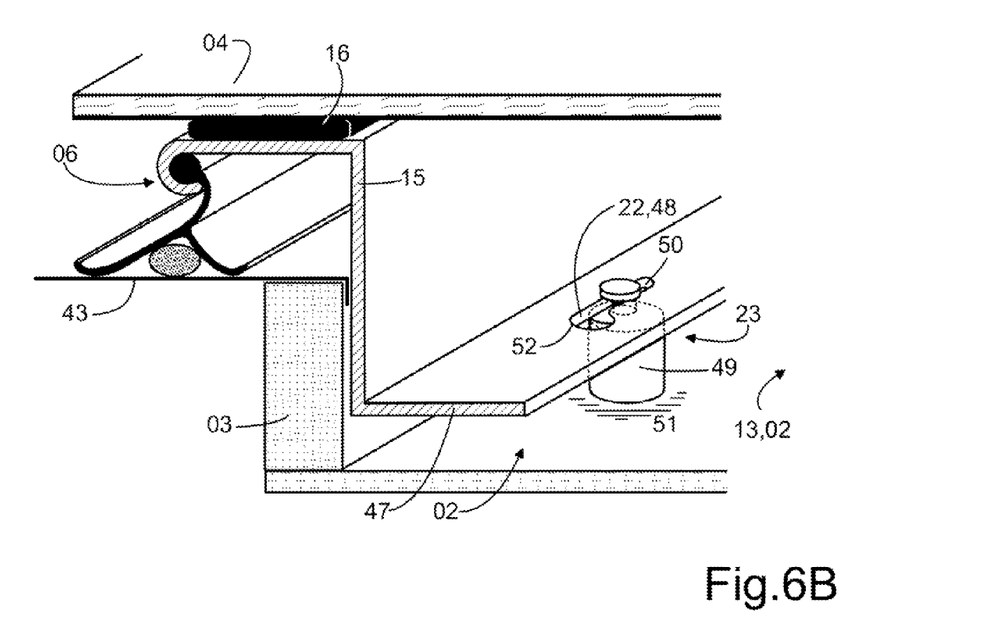
Figure 6C:
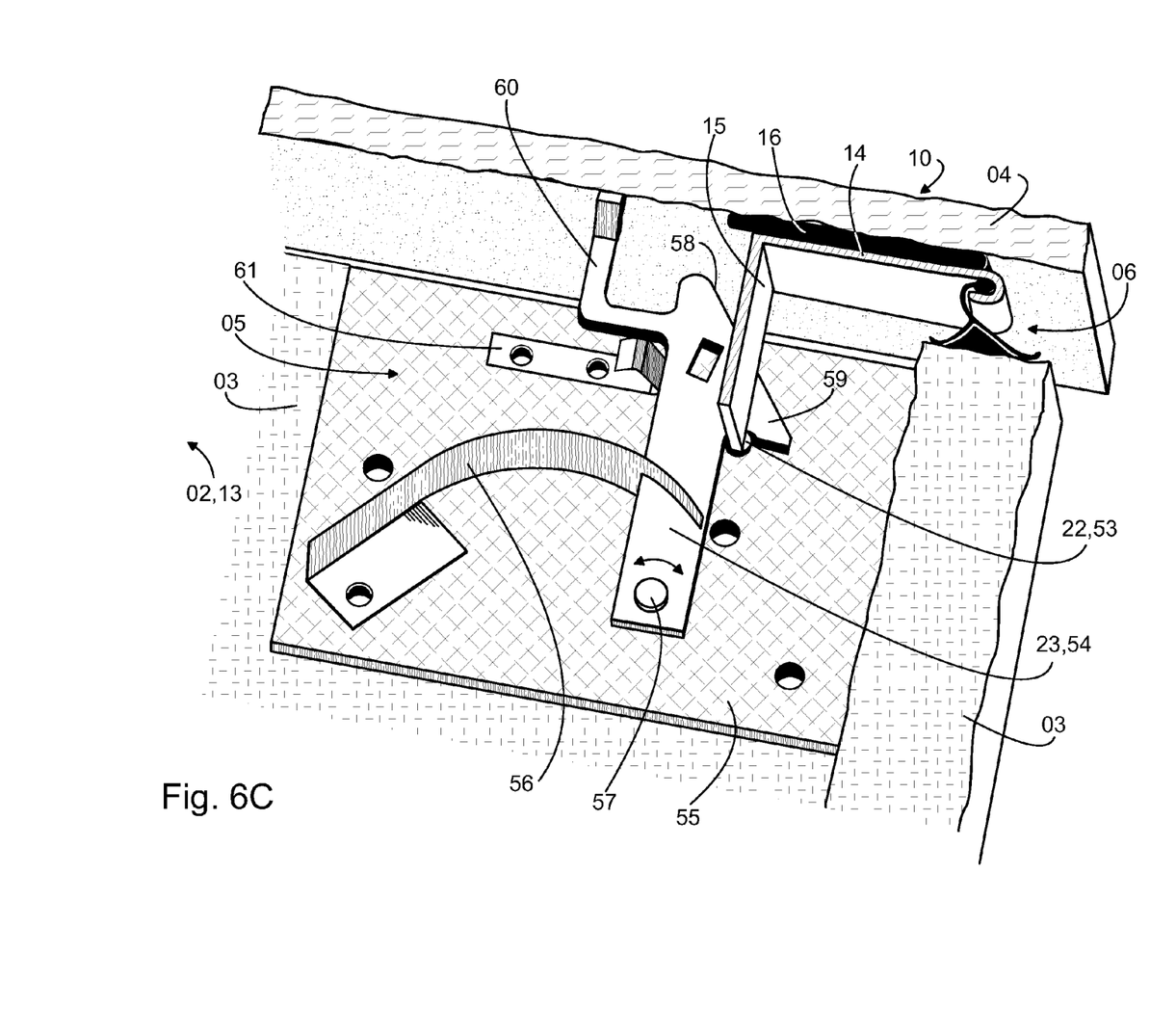

FIGS. 6A, 6B, and 6C show further possible embodiments of the detent device 05 (shown in the locked state). The essentially L-shaped auxiliary profile 30 is provided in FIG. 6A and also has a lower transverse leg 47, which protrudes into the inner area 13 of the housing box 02 and in which the upper detent element 22 is implemented in the form of an insertion profile 48. The lower detent element 23 is implemented in the form of a detent bolt 49 having an insertion groove 50 (shown by dashed lines). The detent bolt 49 is fixedly connected to the housing floor 51 of the housing box 02. For locking, the cover pane 04 having the auxiliary profile 30 is inserted along the housing walls 03 into the housing box 02 from above, the spring-loaded mounting 06 being loaded. The detent bolt 49 is fixed in the area of its insertion groove 50 in the insertion profile 58 by lateral displacement of the cover plate 04. In the exemplary embodiment shown, the auxiliary profile 30 is only implemented sectionally, so that the insertion profile 48 is open and the detent bolt 49 can be threaded in laterally.

FIG. 6B shows an embodiment without auxiliary profile 30. The support profile 15 is implemented as stepped and also has a lower transverse leg 47. Because it is implemented as continuous together with the support profile 15, the insertion profile 48 is implemented as closed and has a threading area 52 for the detent bolt 49.

FIG. 6C shows an embodiment of the detent device 05 in a sectional illustration through the cover plate 02 and the support profile 15 including spring-loaded mounting 06 in front of a housing wall 03 in the inner area 13 of the housing box 02 (looking in the direction of the housing wall 03). The upper detent element 22 is implemented as a pin extension 53 and the lower detent element 23 as a detent hook 54. The pin extension 53 protrudes out of the longitudinal leg 21 of the support profile 15 at the lower end of the support profile 15. The detent hook 54 is fastened on a plate 55 on the housing wall 03 and mounted so it is spring-loaded and rotatable via a spring 56 and an axis 57. Upon vertical insertion of the pin extension 53 from above along a bevel 58, the detent hook 54 is pressed back against the spring 56 and then locks using a detent lug 59 behind the pin extension 53. The spring-loaded mounting 06 of the cover plate 04 generates a restoring force, which results in the unlocking of the cover plate 04 when the detent hook 54 is retracted. A lever 60, into which a corresponding tool can be inserted, is provided for the retraction on the detent hook 54. A spring-loaded retention hook 61 is provided for locking the detent hook 54 in the open position.

Figure 7:
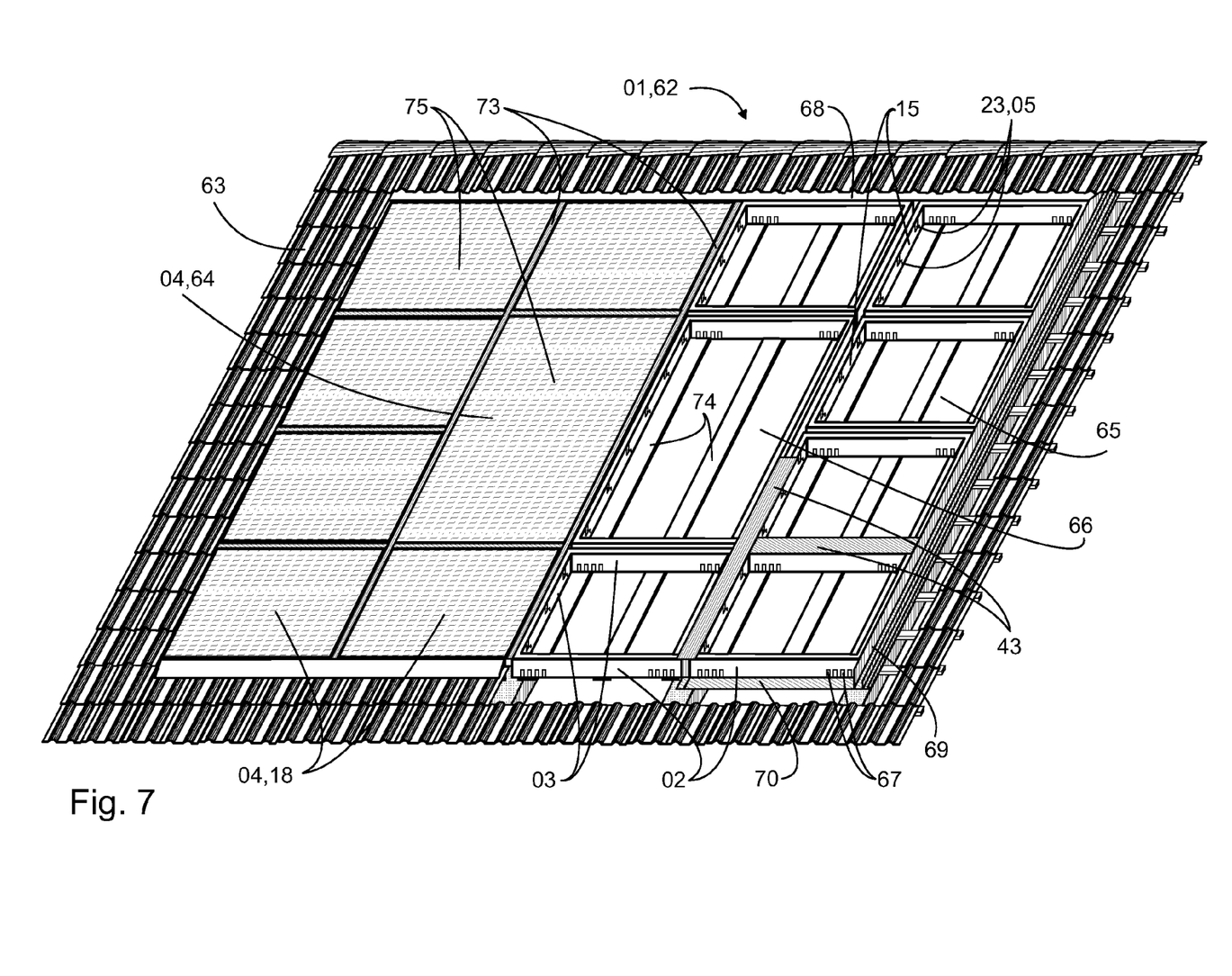
FIG. 7 shows a detail view of the solar installation on a substrate.

FIG. 7 shows a solar installation 01 according to the invention as a water-guiding in-roof configuration 62 on an inclined roof 63 as the substrate in a perspective overall view. Housing boxes 02 having cover plates 04 are shown on the left. The edge-free, harmonic overall impression of the solar installation 01 having a gap 73 of constant width between all cover plates 04 can be seen. It cannot be recognized which solar modules 75 are configured for different functions (photovoltaics, solar thermal energy). Six cover plates 04 are implemented as photovoltaic plates 18 for generating solar current and one cover plate 04 is implemented as a glass plate 64 over a solar absorber (or directly as an absorber plate) for generating solar thermal energy. Housing boxes 02 without cover plates 04 are shown on the right. The housing boxes 02 have no floor, so that the rafters 74 can be seen. Three lower detent elements 23 are indicated in each of the short housing boxes 65 and six lower detent elements 23 in the support profile 15 along the housing wall 03 to form the detent device 05 are indicated in the long housing box 66. The detent elements 23 are provided on both diametrically opposite housing walls 03 and three or six pairs result in each case for the detent device 05. Furthermore, ventilation openings 67 in the housing walls 03 for good ventilation of the housing boxes 02 are shown. Double angled cover sheets 43 are situated between the housing boxes 02 (compare FIGS. 5A, 5B). Corresponding ridge attachment sheets 68 having inclined or edged attachment surfaces for the ridge tile, tile attachment sheets 69 having multiple receptacle edges for adjoining roof tiles and gutter attachment sheets 70 having inclined or edged attachment surfaces for the gutter tiles or the rain spout are provided as the attachment of the housing box 02 on the inclined roof 63.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS 01 solar installation
02 housing box
03 housing wall
04 cover plate
05 detent device
06 spring-loaded mounting
07 spring element
08 lateral surface
09 vertical stroke
10 edge
11 outer side
12 seal element
13 inner area
14 transverse leg
15 support profile
16 seal
17 lower side
18 photovoltaic plate
19 glass pane
20 solar cell layer
21 longitudinal leg
22 upper detent element
23 lower detent element
24 pin
25 bolt
26 through hole
27 undercut profile
28 insertion area
29 retention area
30 auxiliary profile
31 elastic lambda-shaped sealing lip
32 upper leg
33 first lower leg
34 second lower leg
35 first u-shaped bend
36 second u-shaped bend
37 u-shaped end
38 undercut
39 pressure-loaded coiled spring
40 lambda-shaped sealing lip
41 upper leg
42 lenticular head
43 cover sheet
44 open-celled elastic profile
45 spring seal
46 support plate
47 lower transverse leg
48 insertion profile
49 detent bolt
50 insertion groove
51 housing floor
52 threading area
53 pin extension
54 detent hook
55 plate
56 spring
57 axis
58 bevel
59 detent lug
60 lever 61 retention hook
62 in-roof configuration
63 inclined roof
64 glass plate
65 short housing box
66 long housing box
67 ventilation opening
68 ridge attachment sheet
69 tile attachment sheet
70 gutter attachment sheet
71 short leg
72 long leg
73 gap
74 rafter
75 solar module

The invention claimed is:

1. A solar installation comprising at least one solar module, the at least one solar module comprising:
 a cover plate; and
 a housing box, the housing box including:
  housing walls;
  a frame construction including a substantially L-shaped support profile, the support profile including a transverse leg disposed edge-parallel on a bottom side of the cover plate with a seal of the frame construction interposed therebetween, and a longitudinal leg connected to the housing wall;
  a detent device having at least one upper detent element and one lower detent element for fixing the cover plate on the housing box;
  at least two spring elements for mounting the cover plate on the housing walls, the at least two spring elements having a predetermined vertical stroke configured to generate a restoring force, the at least two spring elements being disposed edge-parallel at opposing edges of the cover plate on the bottom side thereof such that, in a mounted position of the cover plate, edge areas on a top side of the cover plate are free of overlap from and do not directly contact a fastening profile; and
  at least two seal elements respectively disposed in front of the at least two spring elements toward respective outer sides of the housing box;
  wherein the upper detent element is fixedly connected to the support profile, the support profile being fixedly connected to the cover plate, the lower detent element being fixedly connected to the housing box, the upper detent element and the lower detent element having a spacing of at most the vertical stroke relative to one another when the detent device is in an open position and the cover plate is disposed on the housing box, and the upper detent element and lower detent element having a detachable engagement to one another when the detent device is in a closed position with the cover plate fixed on the housing box under load of the restoring force.

2. The solar installation of claim 1, wherein the solar installation includes a peripheral configuration of at least one of the auxiliary profile and the seal element on four edges of the cover plate.

3. The solar installation of claim 1, further comprising a lower transverse leg on the support profile that runs in an inner area of the housing box, wherein the upper detent element includes an insertion profile in the lower transverse leg, and the lower detent element includes a detent bolt having an insertion groove, the detent bolt being connected to the housing box.

4. The solar installation of claim 1, wherein the solar installation includes an in-roof configuration having an adjacent configuration of multiple housing boxes, a gap being disposed between adjacent cover plates, and cover sheets or attachment sheets being disposed between adjacent housing boxes or between the housing boxes and an adjoining substrate.

5. The solar installation of claim 1, wherein the cover plate includes a glass plate.

6. The solar installation of claim 1, wherein the cover plate includes a photovoltaic plate, the photovoltaic plate including a glass pane having a solar cell layer disposed on the bottom side of the cover plate, the cover plate having a uniform configuration on a visible side thereof.

7. The solar installation of claim 1, wherein the cover plate includes a photovoltaic plate, the photovoltaic plate including a laminate having embedded solar cells, the cover plate being uniformly designed on the visible side.

8. The solar installation of claim 1, wherein each of the at least two spring elements are configured to provide the vertical stroke of between 2 mm (0.07874016 inches) and 11 mm (01.4330709 inches).

9. The solar installation of claim 1, wherein the spring elements and the seal elements are integrated so as to form an integral spring seal.

10. The solar installation of claim 9, wherein the spring seal includes a substantially lambda-shaped elastic sealing lip, an upper leg of the sealing lip adjoining the transverse leg of the support profile and a first lower leg and a second lower leg adjoining a housing wall of the housing box.

11. The solar installation of claim 9, wherein the seal elements each include at least two lower legs forming a lambda-shaped elastic sealing lip, and further comprising an open-celled elastic profile disposed between the two lower legs of the lambda-shaped elastic sealing lip.

12. The solar installation of claim 10, wherein the lambda-shaped elastic sealing lip includes an upper leg having a first u-shaped bend, the first u-shaped bend engaging behind a second u-shaped bend of an end of the transverse leg of the support profile.

13. The solar installation of claim 1, wherein the lower detent element includes a pin disposed in an inner area of the housing box and the upper detent element includes an undercut profile disposed on the longitudinal leg of the support profile, the longitudinal leg of the support profile including an insertion area and a retention area for the pin.

14. The solar installation of claim 13, wherein the pin includes a bolt fixedly connected to a support plate.

15. The solar installation of claim 1, wherein the upper detent element includes a pin extension on the end of the longitudinal leg of the support profile and the lower detent element includes a pivotable and spring-loaded detent hook disposed on the housing wall.

16. The solar installation of claim 15, further comprising a spring-loaded retention hook in which the detent hook of the detent device is fixable in the open position.

17. The solar installation of claim 1, further comprising, a L-shaped auxiliary profile having a short leg configured to support the cover plate in extension of the transverse leg of the support profile, and a long leg disposed parallel to the longitudinal leg of the support profile.

18. The solar installation of claim 17, wherein the long leg of the auxiliary profile includes an outwardly curved, u-shaped end in the area of an edge of the cover plate without the detent device, the u-shaped end engaging in an undercut in the housing wall when the detent device is in the closed position.

* * * * *